United States Patent [19]
Troxell et al.

[11] Patent Number: 5,953,161
[45] Date of Patent: Sep. 14, 1999

[54] INFRA-RED IMAGING SYSTEM USING A DIFFRACTION GRATING ARRAY

[75] Inventors: John Richard Troxell, Sterling Heights; Marie Irene Harrington, Troy, both of Mich.

[73] Assignee: General Motors Corporation, Detroit, Mich.

[21] Appl. No.: 09/086,907

[22] Filed: May 29, 1998

[51] Int. Cl.$^6$ .................................................. G02B 27/10
[52] U.S. Cl. ........................... 359/618; 359/558; 359/566; 359/572; 359/196; 359/298
[58] Field of Search .................................. 359/618, 558, 359/563, 566, 572, 350, 353, 196, 209, 298, 291

[56] References Cited

U.S. PATENT DOCUMENTS

| | | | |
|---|---|---|---|
| 5,091,798 | 2/1992 | Hibino | 359/209 |
| 5,311,360 | 5/1994 | Bloom et al. | 359/572 |
| 5,335,108 | 8/1994 | Harris | 359/209 |
| 5,336,875 | 8/1994 | Ono et al. | 359/566 |
| 5,369,526 | 11/1994 | Chiang | 359/566 |
| 5,587,829 | 12/1996 | Alexander et al. | 359/298 |
| 5,661,592 | 8/1997 | Bornstein et al. | 359/291 |
| 5,682,262 | 10/1997 | Wefers et al. | 359/566 |
| 5,689,491 | 11/1997 | Isobe et al. | 359/566 |
| 5,808,797 | 9/1998 | Bloom et al. | 359/572 |

OTHER PUBLICATIONS

Solid State Sensors and Actuators Workshop (Jun. 13–16, 1994), "Grating Light Valves for High Resolution Displays" by Raj B. Apte, Francisco S. A. Sandejas, William C. Banyai and David M. Bloom, Glinzton Laboratory, Stanford University.

Proceedings of the SPEI Conference 2463 on Synthetic Vision for Vehicle Guidance and Control, Apr. 1995, "Color Night Vision: Fusion of Intensified Visible and Thermal IR Imagery", by Allen M. Waxman, David A. Fay, Alan Gove, Michael Seibert, Joseph P. Racamato, James E. Carrick, and Eugene D. Savoye, MIT Lincoln Laboratory.

Elsevier, Sensors and Actuators A 57 (1996) 145–151, "Polysilicon Micromechanical Gratings for Optical Modulation", by D. E. Sene, V. M. Bright, J. H. Comtois, J. W. Grantham.

SPIE vol. 3046—0277–786X/97, (Smart Structures and Materials 1997—Smart Electronics and MEMS) "Gray Scale Deformable Grating Spatial Light Modulator for High Speed Optical Processing", by Miles L. "Scotty" Scott, Lawrence A. Bieber, Dr. T. S. Kalkur, University of Colorado.

*Primary Examiner*—Loha Ben
*Attorney, Agent, or Firm*—George A. Grove; Robert M. Sigler

[57] ABSTRACT

In an infra-red imaging system, infra-red radiation from a scene is optically collected and directed to form an infra-red image of the scene on an array of bi-state diffraction grating elements. Each bi-state diffraction grating element has an activated state providing diffraction of incident infra-red radiation at a predetermined angle from the incident direction and an alternative inactivated state providing no such diffraction at the predetermined angle. Scanning apparatus sequentially activates the bi-state diffraction grating elements temporarily from their inactivated states to their activated states to produce a scanned infra-red image of the scene in IR radiation diffracted by the elements at the predetermined angle, which is collected and directed to an infra-red detector. The detector provides a coded electrical representation of the scanned infra-red image of the scene to further apparatus which generates therefrom a human-detectable signal. The separation of scanning from detection allows a single detector to be used for the detection of multiple pixels and thus reduces the size, complexity and cost of the detector apparatus. The scanning apparatus may also provide a chopping function by delaying the activation of each bi-state diffraction grating element to its activated state for a predetermined time period after a deactivation to the inactivated state of the previous sequentially activated diffraction grating element. The apparatus may combine IR radiation at two wavelengths by providing separate detectors at the angle of diffraction of each wavelength or by mixing diffraction grating elements of different grating pitch providing diffraction of each wavelength at the same angle to a single IR detector. Some embodiments may provide combination of IR and visible light for an enhanced visible image.

7 Claims, 7 Drawing Sheets

INFRA-RED IMAGING SYSTEM USING A DIFFRACTION GRATING ARRAY

TECHNICAL FIELD

The technical field of this invention is an imaging system which derives a human-detectable signal from an infra-red image of a scene.

BACKGROUND OF THE INVENTION

Electromagnetic radiation in the infra-red region (IR radiation) can be a useful tool for obtaining information about an object when visible light is low or non-existent or when it is absorbed or scattered by the atmosphere. In the former case, there may be insufficient visible light to provide a reflected visible image of the object; but IR radiation is directly emitted from objects in amounts varying with their temperature regardless of the amount of visible light present for reflection from the objects. In the latter case, there are several wavelength bands within the total IR spectrum which are transmitted with relatively less loss and/or scatter through fog, mist and similar atmospheric conditions which scatter and/or absorb visible light. In either case, moreover, IR radiation provides information relating to the temperature of objects: information which is useful for the differentiation of objects in a scene but is not available at the shorter wavelengths of visible light.

Use of this tool in scanning a scene, however, has been hampered by the expense and difficulty of detecting the IR radiation. Generally, detecting an image of a scene requires scanning an array of detectors, serially detecting the IR radiation falling on each individual element of the detector array and reporting out that information to the user in some appropriate format. Such an array of IR detectors is quite expensive: prohibitively so for many consumer applications. In addition, such detectors typically require the use of materials with which it is difficult to provide uniformity of response from one detector to the next. This produces an undesirable skewing of information from different parts of the scene. Furthermore, many such detectors are thermally activated and require their input to be chopped so as to provide a thermal recovery period between sequential readings. Such chopping has traditionally been provided by moving optical apparatus, such as spinning or oscillating mirrors, placed in the optical path to the detector(s); and this apparatus further increases the expense and mechanical complexity of the apparatus.

SUMMARY OF THE INVENTION

The infra-red imaging system of this invention reduces the cost and difficulties described above by separating the scanning function from the detecting function so that a single infra-red detector can be used to detect infra-red radiation from the entire scene without the need for complicated mechanical optical scanning apparatus. Infra-red radiation from a scene is optically collected and directed to form an infra-red image of the scene on an array of bi-state diffraction grating elements. Each bi-state diffraction grating element has an activated state providing diffraction of incident infra-red radiation at a predetermined angle relative to an incident direction and an alternative inactivated state not providing diffraction of incident infra-red radiation at the predetermined angle. Scanning apparatus sequentially activates the bi-state diffraction grating elements temporarily to their activated states to produce a scanned infra-red image of the scene diffracted from the array at the predetermined angle; and an infra-red detector is disposed at the predetermined angle to receive the diffracted infra-red radiation. The detector provides a coded electrical representation of the scanned infra-red image of the scene to further apparatus which generates therefrom a human-detectable signal.

The scanning apparatus may also provide a chopping function by delaying the activation of each bi-state diffraction grating element to its activated state for a predetermined time period after a return to an inactivated state by the previous sequentially activated diffraction grating element.

The apparatus may alternatively provide an enhanced image using two infra-red detectors to detect infra-red radiation of two different wavelengths diffracted from a single diffraction grating array at two different predetermined angles.

The apparatus may alternatively provide an enhanced image using a single infra-red detector to detect infra-red radiation of two different wavelengths diffracted from a single diffraction grating array at the same predetermined angle. In this case, the diffraction grating array mixes diffraction grating elements having two different grating pitches: one providing diffraction at the predetermined angle at one of the infra-red wavelengths and the other providing diffraction at the predetermined angle at the other infra-red wavelength.

DESCRIPTION OF THE PREFERRED EMBODIMENT

Figure 1:
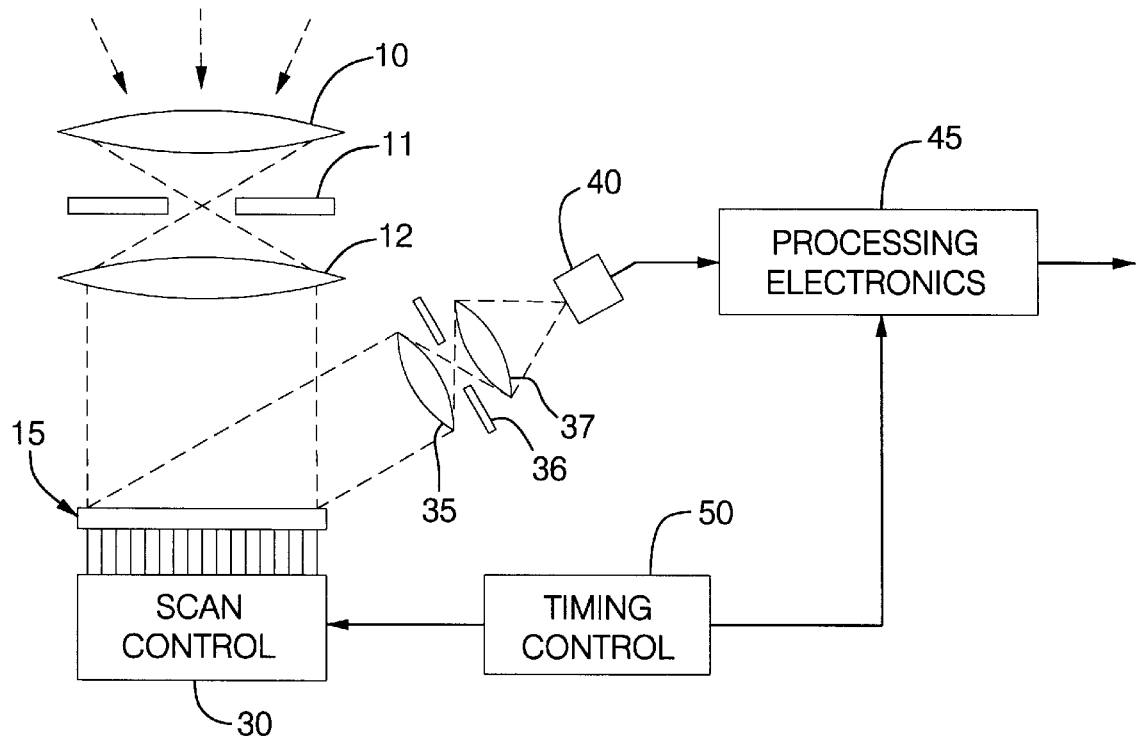
FIG. 1 shows a schematic diagram of a preferred embodiment of an infra-red imaging system according to the invention.

Referring to FIG. 1, electromagnetic radiation from a scene, which includes infra-red (IR) radiation emitted from objects in the scene and may also include visible and infra-red radiation reflected from objects in the scene, is collected and directed by conventional optical apparatus, represented by lenses 10 and 12 and an aperture or diaphragm 11. Lens 10 represents optical apparatus for collecting electromagnetic radiation from the scene. Although a single lens may be sufficient, other equivalent arrangements of lenses or equivalent apparatus are known in the art. Aperture 11 represents optical apparatus for eliminating electromagnetic radiation which is not from the scene; and lens 12 represents optical apparatus for directing and focusing the electromagnetic radiation passed by the previous two elements. The apparatus may also comprise optical filter apparatus, not shown, for eliminating radiation in wavelength bands which are not of interest in a specific imaging system. This optical apparatus directs the collected IR radiation to a diffraction grating array (DGA) 15 in such manner as to provide an IR image of the scene on the array. A visible image of the scene may simultaneously be formed on the array, but this is not required for this invention. The apparatus for collection and direction of electromagnetic radiation is not to be limited to refractive apparatus as shown: reflective optical apparatus may be used, either alternatively or in combination as known to those skilled in the art of optical design. Reflective optics may provide particular advantages in embodiments requiring the collection and direction of electromagnetic radiation at two or more greatly different wavelengths.

Figure 2:
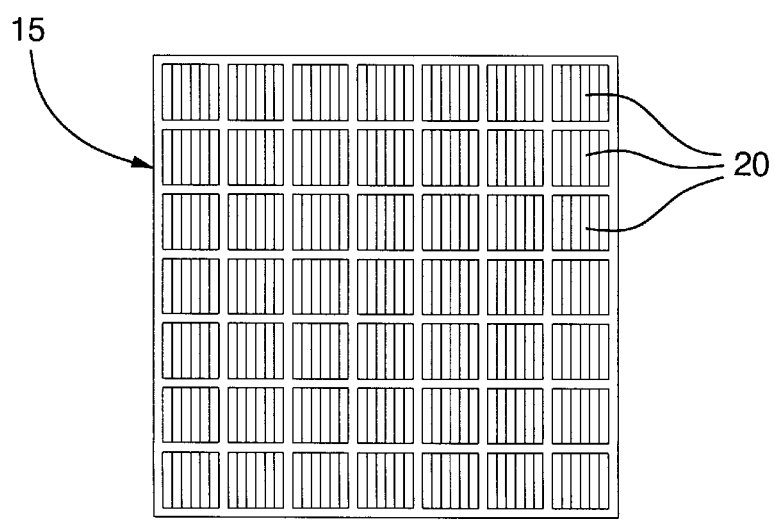
FIG. 2 shows a top view of a diffraction grating array for use in the system of FIG. 1.

DGA 15 comprises a plurality of diffraction grating (DG) elements 20 arranged in a two-dimensional array, a portion of which is shown in FIG. 2. Each of DG elements 20 comprises a bi-state diffraction grating responsive to IR radiation at a predetermined IR wavelength. Each DG element 20 is responsive to an electric control signal to switch to an activated state in which it diffracts IR radiation of the predetermined IR wavelength at a predetermined angle relative to the incident direction from an inactivated state in which it does not diffract IR radiation of the predetermined wavelength at the predetermined angle relative to the incident direction. The second angle is sufficiently different from the first angle that an IR detector placed in the diffraction path at the second angle will not detect significant IR radiation diffracted at the first angle.

Figure 3A:
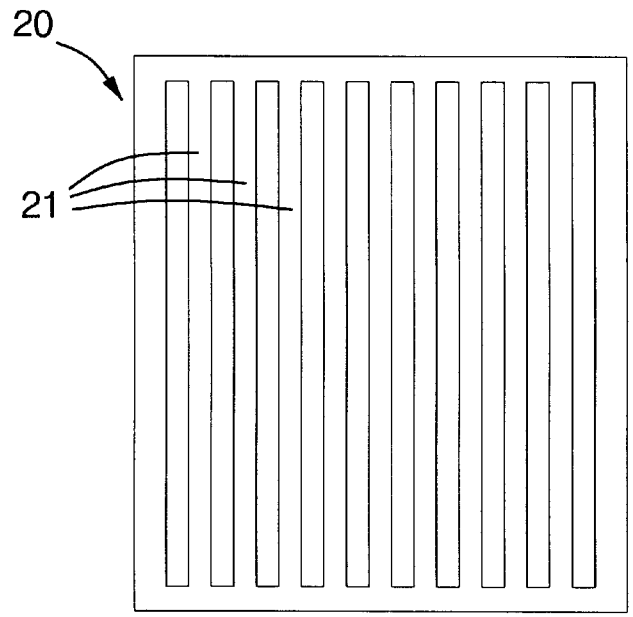
FIGS. 3A–3C show top and side views of the diffraction grating element for use in the array of FIG. 2 in an inactivated state.
Figure 3B:
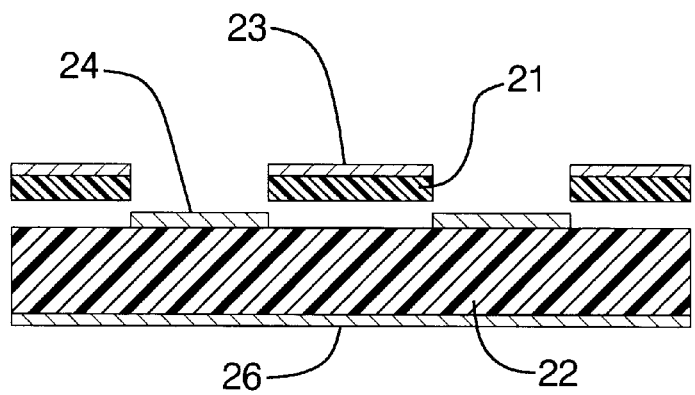
Figure 3C:
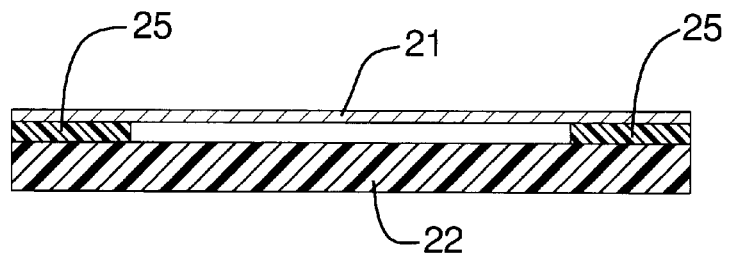

A representative DG element 20 is shown in its inactive state in FIGS. 3A–3C. FIG. 3A shows the element in top view, with a plurality of parallel bars 21 of constant width, the width of each bar being on the order of one half the pitch between adjacent bars. FIG. 3B shows a side cutaway view perpendicular to bars 21. Each bar 21 is suspended over and parallel to a substrate 22. Bars 21 are each provided with an optically reflective and electrically conducting coating 23 on the upper surface thereof, with a similar coating 24 on the upper surface of substrate 22 between each two adjacent bars 21. FIG. 3C is a side cutaway view of DG element 20 parallel to bars 21 which shows how a bar 21 is suspended at each end by a support 25 over substrate 22. In the inactive state shown, the vertical distance between coating 23 on the upper surface of bars 21 and coating 24 on substrate 22 is one half the wavelength of incident electromagnetic radiation; and the incident radiation will be reflected at an angle equal to the angle of incidence.

Figure 4A:
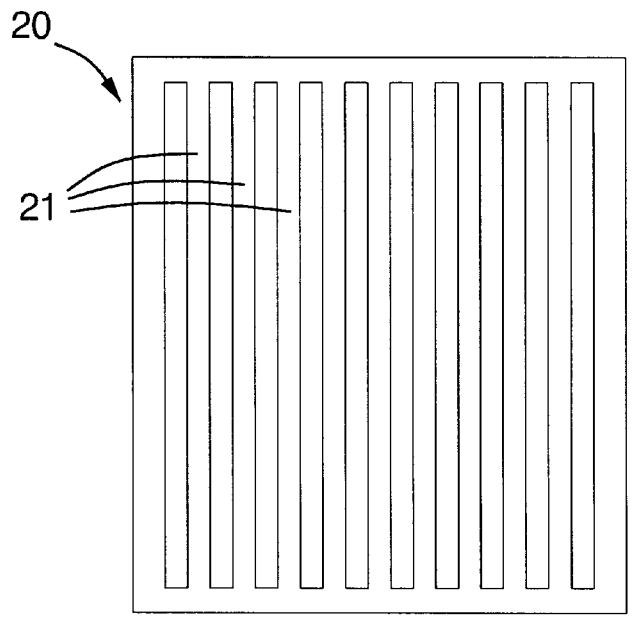
FIGS. 4A–4C show top and side views of the diffraction grating element of FIG. 3A–3C in an activated state.
Figure 4B:
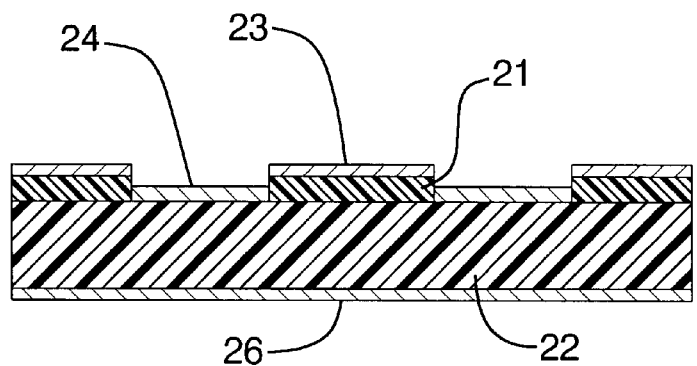
Figure 4C:
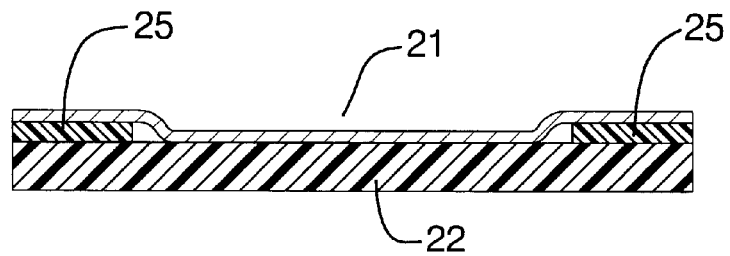

An electrical conductor 26 under substrate 22 may be provided with a voltage relative to the voltage on coatings 23, which voltage attracts bars 21 downward. When this voltage reaches a first predetermined voltage, DG element 20 is activated to its activated state, as bars 21 collapse deformably to the position shown in FIGS. 4A–4C. FIG. 4A shows the element in top view, from which perspective it looks similar to the inactive state. However, FIG. 4B, with the element seen perpendicular to bars 21, shows that the bars have moved downward against substrate 22. This is confirmed in FIG. 4C, which shows bars 21 deformed downward. The vertical distance between coatings 23 and coating 24 is now one quarter wavelength of the incident electromagnetic radiation; and the grating thus diffracts the incident electromagnetic radiation at an angle determined by the wavelength ($\lambda$) of the incident electromagnetic radiation and the grating pitch (d), that is the spacing between bars 21. For incident light perpendicular to the grating, the angle $\theta$ of diffraction is given by:

$$d \sin\theta = n\lambda.$$

For incident light at an angle $\theta1$ from perpendicular to the grating, the angle $\theta2$ of diffraction is given by:

$$d (\sin\theta1 - \sin\theta2) = n\lambda.$$

In either case, n can take positive or negative integer values, but the intensity of the diffracted light decreases significantly for $|n|>1$. The preferred choice is therefore for $n=+/-1$. With an appropriate choice of the incident angle, e.g. perpendicular to the grating, the predetermined angle of diffraction produced by the grating in its activated state can be made different from the angle of reflection or diffraction produced by the grating in its inactivated state. In this embodiment, reduction of the applied voltage below a second predetermined voltage, lower than the first predetermined voltage due to hysteresis, allows bars 22 to return to their elevated positions. The type of DG element described above is described in further detail in U.S. Pat. No. 5,311,360, Method and Apparatus for Modulating a Light Beam, issued May 10, 1994 to Bloom et al and the paper "Grating Light Valves for High Resolution Displays," presented by Raj B. Apte et al at the Solid State Sensors and Actuators Workshop, Hilton Head Island, S.C., Jun. 13–16, 1994.

Thus, each DG element 20 has an activated state in which incident infra-red radiation is diffracted at a predetermined angle from the incident direction and an inactivated state in which such diffraction is not produced. In this document, the terms "activated" and "inactivated" refer to the diffraction of radiation in the predetermined manner and not to the mechanism of operating the grating. Although the embodiment described uses diffraction grating elements having an "activated" state in which a voltage is applied and an inactivated state to which it tends to return when this voltage is not applied, another embodiment might be designed with diffraction grating elements operated in the opposite manner: i.e. having an "activated state" providing diffraction in a predetermined manner to which the element returns when a voltage is not applied and an "inactivated" state to which the grating element switches in response to an applied voltage. Alternatively, the diffraction grating elements might be bi-stable, with different voltages applied to produce each state. In any case, the "activated" state is that which provides diffraction in the predetermined manner (or whose diffraction pattern is chosen to be the predetermined manner); and the "inactivated" state is that which does not provide such diffraction, regardless of what mechanism is applied to achieve either state.

A scan/chop control 30 is capable of applying a voltage to each of the DG elements 20 of array 15 independently so as to switch each of them between its inactivated and activated states. Scan/chop control 30 normally maintains each of DG elements 20 in its inactivated state, with bars 21 elevated, but scans all the DG elements of array 15 sequentially in a predetermined pattern by switching each element, in turn, temporarily to its activated state and then back to its inactivated state before proceeding to the next element. Thus, a time-separated stream of IR radiation samples, of the same IR wavelength, from all areas of the scene in a predetermined order is diffracted at the predetermined angle. If each DG element is activated to the second state just as the previously activated DG element is deactivated to the first state, the IR radiation diffracted from the DG elements 20 at the predetermined angle represents a scanned IR image of the scene. But if the activation of each DG element is delayed for a time period after the deactivation of the previously activated DG element, the scanned IR image of the scene is also chopped. Radiation at other wavelengths, such as visible light, will be similarly treated by the DG elements 20, but at different angles according to the equations shown above. If the IR band of interest is not too close in wavelength to the visible light band, the radiation diffracted at the second angle will include very little, if any, visible light.

The infra-red radiation diffracted at the predetermined angle is collected by conventional optic collection apparatus represented by lenses 35 and 37 and aperture or diaphragm 36, which represent apparatus similar to that represented by elements 10, 12 and 11 described previously, and focused on an infra-red (IR) detector 40, which may be disposed at the predetermined angle relative to the incident direction. IR detector 40 converts the detected IR radiation to an output electric signal providing a coded electrical representation of the scanned and chopped IR image of the scene. IR detector 40 may be any such detector which is responsive to IR radiation to generate an electrical signal thereof. If IR detector 40 is of the type which does not require thermal recovery, the image need only be scanned, and the IR radiation from the successively scanned DG elements 20 will arrive at IR detector 40 in a substantially continuous manner. Chopping, however, will cause the IR radiation from successively scanned DG elements 20 to be separated by predetermined time periods, which will provide thermal recovery required by some types of IR detector.

The electric signal output by IR detector 40 is provided to. processing electronics 45, which derives the IR intensity data from it and generates therefrom a human-detectable signal. Various signals are possible, some of which are known in the art of IR vision apparatus. For example, the data from the successively scanned DG elements 20, which comprise picture elements (pixels) of the scene, may be used to generate a representative visible image on a known two-dimensional display device. In this example, the displayed image is a visible light analog of the IR image formed on DGA 15 presented for interpretation by a viewer. This data could also be combined, pixel by pixel, with visible light data from the same scene to form a combined visible and IR image. In this case, the visible image of the scene is enhanced by the IR data for viewer interpretation. But an actual image is not the only possible human-detectable signal. An algorithm may be embodied in processing electronics 45 to analyze the data stream from IR detector 40 in a predetermined manner and provide a symbolic signal or message to the operator of the imaging system. An example would be an algorithm searching for an object, recognized as a connected area of pixels providing a consistently higher or lower intensity IR output than the surrounding pixels and matching predetermined criteria as to size, shape, location and/or movement within the scene. Upon recognition of such an object, any known symbolic signal may be generated, such as a visible or audible alarm, a readable output on a text display or a superposition of a meaningful symbol on a display of the scene derived from visible light. Naturally, the image and symbolic displays could also be combined in many ways known in the art.

Timing control 50 maintains synchronism between scan/chop control 30 and processing electronics 45, so that the processing electronics "knows" when the light diffracted from each individual pixel begins and ends and what part of the scene it represents. Preferably, a single digital computer or digital signal processor may combine the functions of timing control 50, scan/chop control 30 and processing electronics 45. In such apparatus, the timing control activates each successive DG element in a predetermined order for a predetermined time, with a predetermined delay between activations if chopping is desired. The processing apparatus comprises an A/D converter which is provided with the output voltage of the IR detector and outputs a digital representation of this voltage, and thus the IR intensity of the pixel, at the end of the predetermined time. This digital number may then be stored in a memory location corresponding to the specified pixel. or combined with pixel location bits in a longer digital number, the pixel location being communicated by the timing control. Preferred methods of handling the resulting matrix of IR intensity values are well known in the field of digital image processing.

Figure 5:
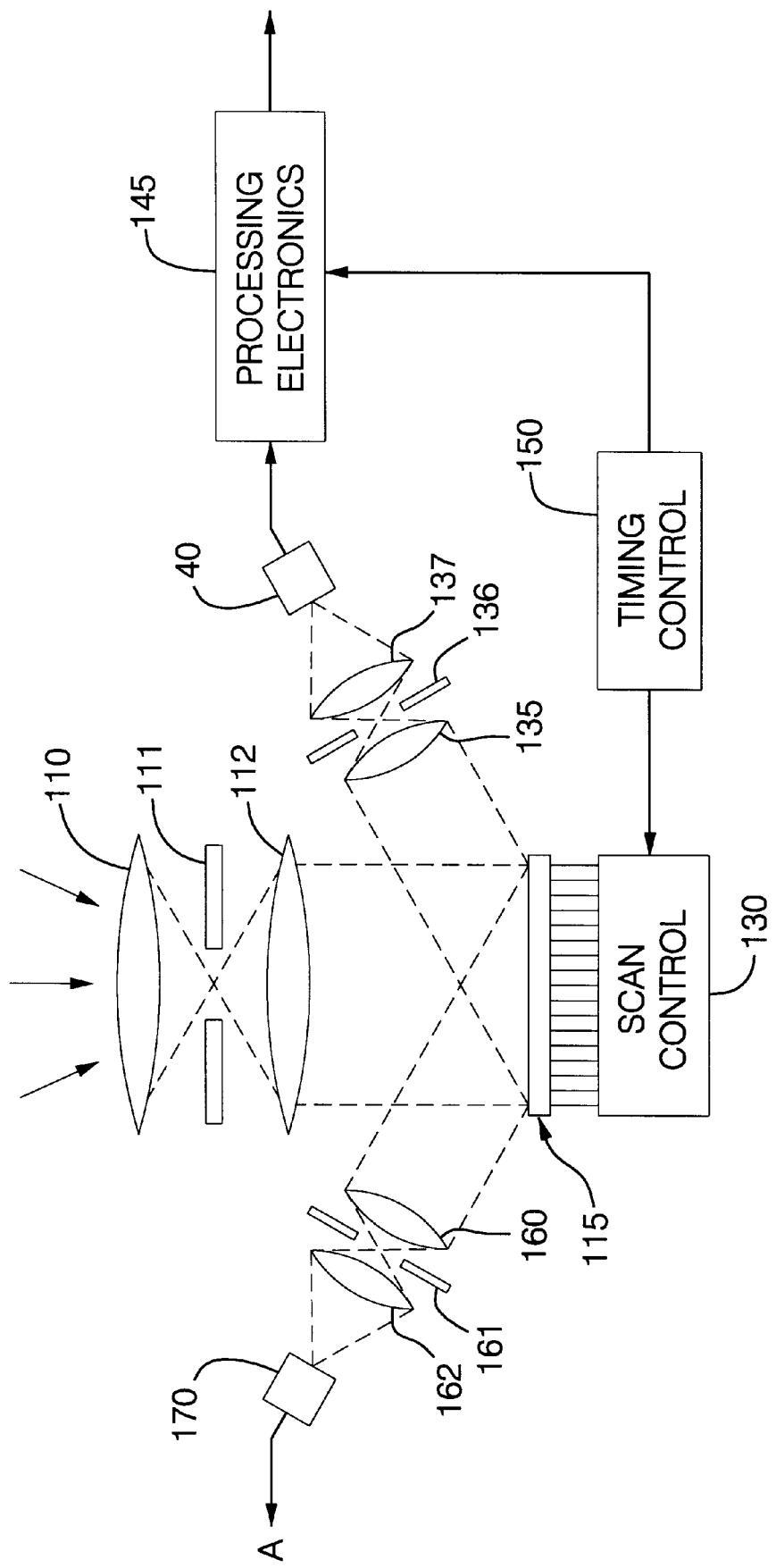
FIGS. 5–7 show alternative embodiments of infra-red imaging systems according to the invention.

An alternative embodiment, shown in FIG. 5, is based on the fact that the IR radiation diffracted by a diffraction grating is split into two diffracted paths, each diffracted at the diffraction angle relative to the incident angle but in opposite directions (n=+1 or −1 in the preceding equations). This embodiment provides two detectors, one on each side of the incident radiation path. In FIG. 5, elements corresponding to elements of FIG. 1 have reference numerals higher by 100. Thus, lenses 110 and 112, aperture 111, DGA 115, DG elements 120, lenses 135 and 137, aperture 136, scan/chop control 130, IR detector 140, processing electronics 145 and timing control 150 are identical to, or at least performing functions similar to, their counterparts numbered 10, 12, 11, etc. in FIG. 1. In addition, the IR radiation diffracted at the predetermined angle to the left in the Figure is collected by conventional optic collection apparatus represented by lenses 160 and 162 and aperture or diaphragm 161, which are essentially identical to, or at least performing functions similar to, elements 135, 137 and 136, and focused on an IR detector 170, which converts the detected IR radiation to an output electric signal representing another, supplementary coded electrical representation of the scanned IR image of the scene. This signal is provided to processing electronics 145, which is provided with a second input for its receipt. Processing electronics 145 may be modified to combine the inputs, for example by summing the signals from IR detectors 140 and 170. The combined signal may then be processed as described above for the embodiment of FIG. 1.

Figure 6:
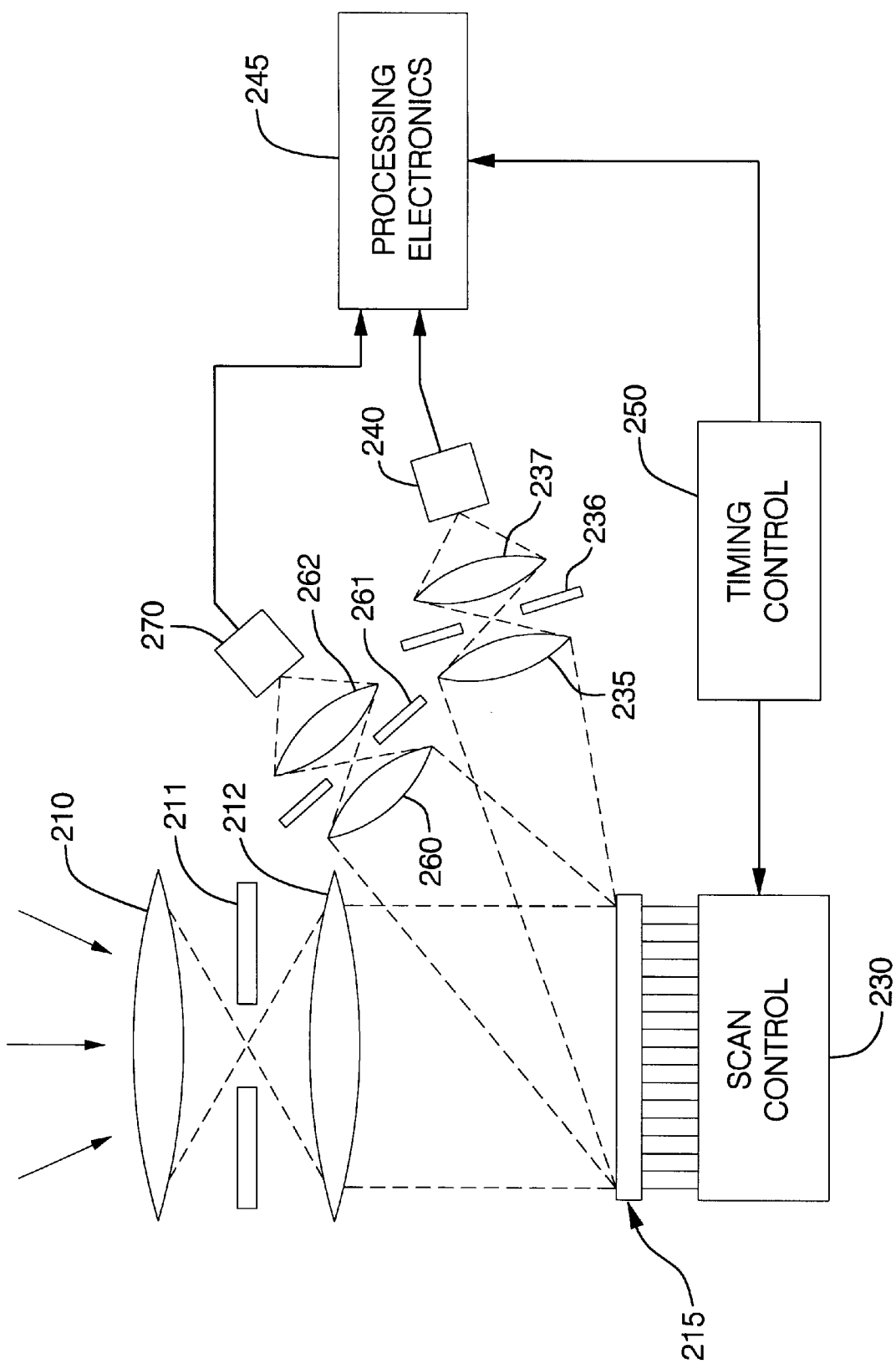

Another embodiment is shown in FIG. 6. This embodiment provides outputs at two different electromagnetic wavelengths which are diffracted by the same diffraction grating element at significantly different angles. For example, two different bands of the IR spectrum may be separately detected. Across the IR spectrum, there is a great variation in susceptibility to absorption and scattering of radiation by atmospheric components such as mist and fog; but the susceptibility to each at any given wavelength is predictable. Consequently, fusion of data obtained at two different IR wavelengths can yield improved detection of potential obstacles over that achieved by sensing systems operating in either individual wavelength band.

In FIG. 6, elements corresponding to elements of FIG. 1 have reference numerals higher by 200. Thus, lenses 210 and 212, aperture 211, DGA 215, DG elements 220, lenses 235 and 237, aperture 236, scan/chop control 230, IR detector 240, processing electronics 245 and timing control 250 are identical or similar to their counterparts numbered 10, 12, 11, etc. in FIG. 1. The IR radiation diffracted at a first predetermined angle to IR detector 240 has a first wavelength. But the scene also emits IR radiation at a second wavelength, which is diffracted at a second predetermined angle, which is significantly different from the first predetermined angle at which IR radiation of the first wavelength is collected by conventional optic collection apparatus represented by lenses 260 and 262 and aperture or diaphragm 261, which are essentially identical to elements 135, 137 and 136, and focused on an IR detector 270, which converts the detected IR radiation diffracted at the third angle to an output electric signal representing another, supplementary coded electrical representation of the scanned IR image of the scene. This signal is also provided to processing electronics 245, which is provided with a second input for its receipt. Processing electronics 245 is further modified to process signals from IR detectors 240 and 270, with combination of the signals or information therefrom somewhere in the processing path. Ultimately, a visible image may, for example, be created from the two IR data streams to visibly show an enhanced IR image derived from the IR images at the two IR wavelengths.

An alternative approach to the adaptation of this invention to IR radiation at two different wavelengths is to use a differential grating array comprising differential grating elements with different grating pitches designed to diffract IR radiation of the two different wavelengths at the same angle. In such apparatus, the diffracted IR radiation of both wavelengths is directed to a single IR detector.

Figure 7:
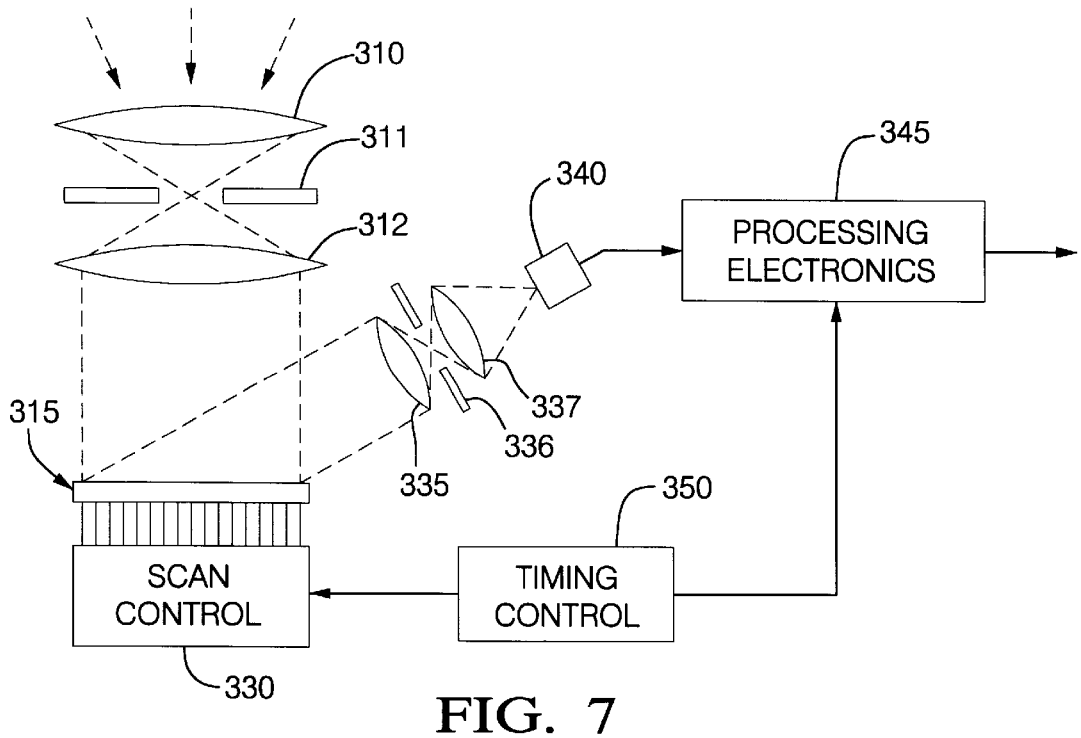
Figure 8:
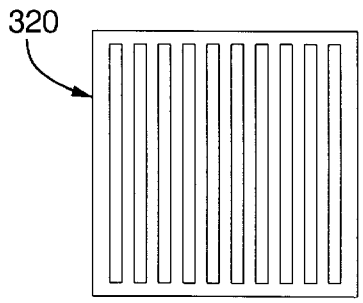
FIGS. 8 and 9 show diffraction grating elements for the embodiment of FIG. 7.
Figure 9:
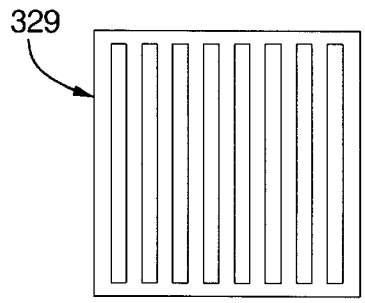
Figure 10:
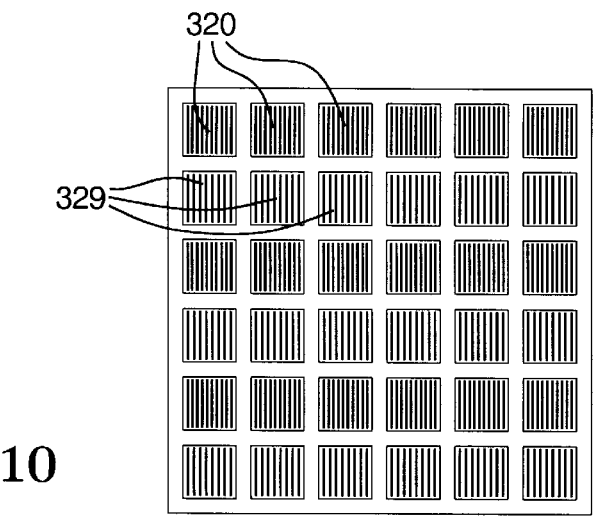
FIG. 10 shows a portion of a diffraction grating array incorporating diffraction grating elements as shown in FIGS. 8 and 9 for use in the embodiment of FIG. 7.

Such an embodiment is shown in FIG. 7, in which elements corresponding to elements of FIG. 1 have reference numerals higher by 300. Thus, lenses 310 and 312, aperture 311, lenses 335 and 337, aperture 336, scan/chop control 330, IR detector 340, processing electronics 345 and timing control 350 are identical or similar to their counterparts numbered 10, 12, 11, etc. in FIG. 1. DGA 315, while similar in construction to its counterpart DGA 15 in FIG. 2, contains two types of DG elements, which are mixed according to a predetermined pattern. As seen in FIG. 10, DGA 315 provides DGA elements 320 and 329 in a predetermined alternating pattern. It is shown in alternating rows but may alternatively have alternating columns or may alternate in both the row and column directions. DGA elements 320, as shown in FIG. 8, have a first grating pitch which, in the activated state, diffract IR radiation of a first frequency at a predetermined angle. DGA elements 329, as shown in FIG. 9, have a different grating pitch which, in the activated state, diffract IR radiation of a second frequency at the same predetermined angle. Thus, diffracted IR radiation of both frequencies is directed to IR detector 340, which generates a signal containing alternating IR image data at both wavelengths. These images may be separated and processed or combined and processed together in processing electronics 345.

Figure 11:
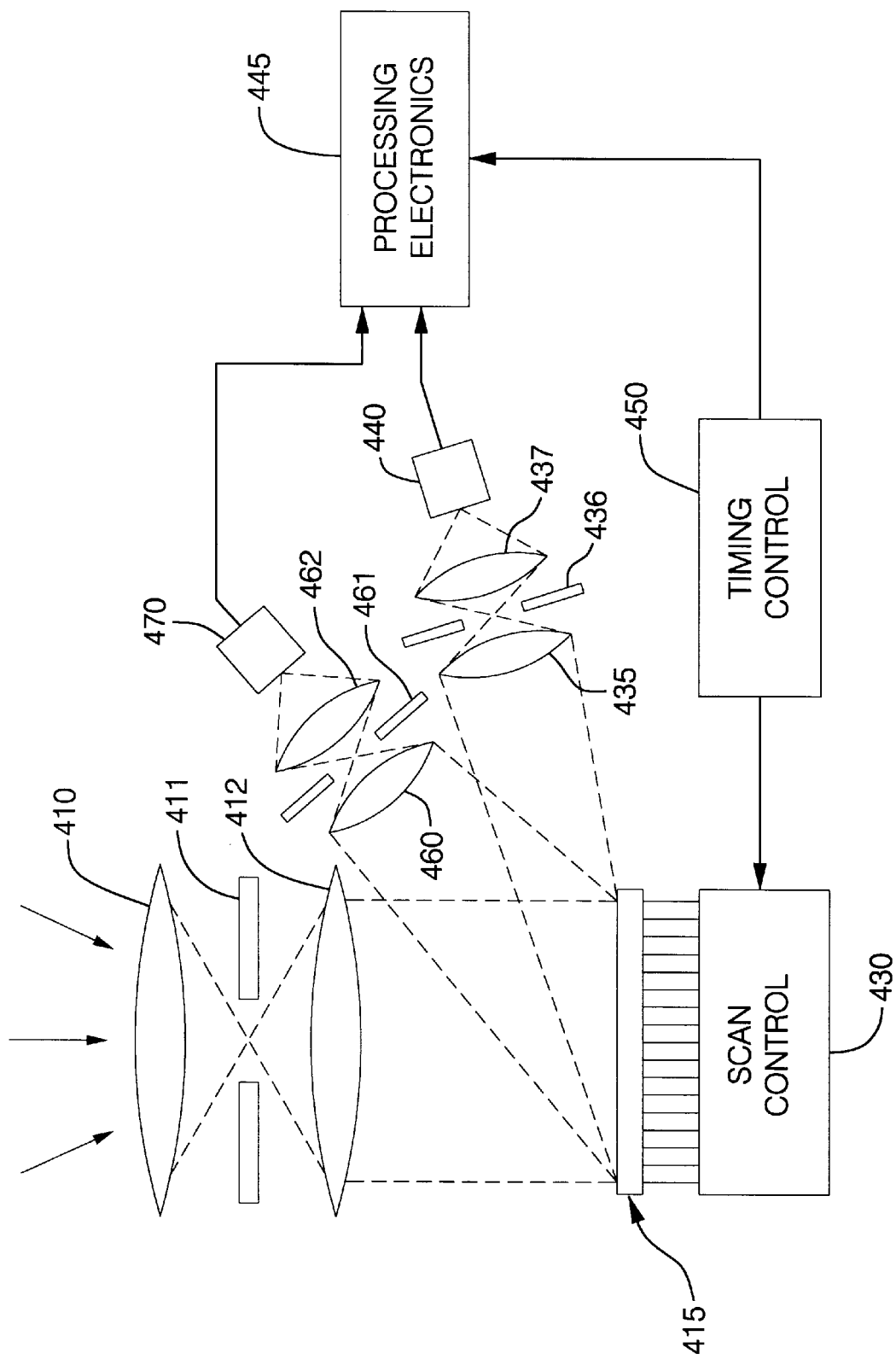
FIG. 11 shows an alternative embodiment of an infra-red imaging system according to the invention.

As previously stated, the IR imaging system of this invention may be used to enhance a visible light image of a scene. The embodiment of FIG. 11 is such a system. In FIG. 11, elements corresponding to elements of FIG. 1 have reference numerals higher by 400. Thus, lenses 410 and 412, aperture 411, DGA 415, DG elements 420, lenses 435 and 437, aperture 436, scan/chop control 430, IR detector 440, processing electronics 445 and timing control 450 are identical or similar to their counterparts numbered 10, 12, 11, etc. in FIG. 1. A wavelength band of visible light is diffracted by DGA 415 at a second predetermined angle as each successive DG element 420 is activated temporarily to its second state. The diffracted visible light is collected by conventional optical collection apparatus represented by lenses 460 and 462 and aperture diaphragm 461, which may be similar to elements 135, 137 and 136 but adapted to the wavelengths of visible light, and focused on a visible light detector 470, which converts the detected visible light diffracted at the second predetermined angle to an output electric signal representing a coded electrical representation of a scanned visible image of the scene. This signal is also provided to processing electronics 445, which is provided with a second input for its receipt. Processing electronics 445 is further modified to process signals from IR detector 440 and visible light detector 470, with combination of the signals or information therefrom somewhere in the processing path. The IR and visible signals corresponding to each pixel may, for example, be combined individually to form an IR enhanced visible image of the scene.

The apparatus described above may be optimized for one or more particular infra-red wavelengths. As mentioned in the Background section of this document, it is known that infra-red radiation in certain wavelength bands is not absorbed by atmospheric moisture. Two such wavelength bands are centered about 2.3 microns (in the near infra-red region) and about 4 microns (in the middle infra-red region). For applications requiring visibility through fog or mist, the embodiments of FIGS. 1, 5 or 10 could be optimized for infra-red radiation in either band. The 2.3 micron band, in particular, is quite close to the band of visible light and thus might be particularly optically suitable for use in the combined infra-red and visible radiation system of FIG. 11. The embodiments of FIG. 6 or 7 are responsive to infra-red radiation at two wavelengths and could thus be optimized for both bands. There is another high transmittance band of infra-red wavelengths (8–14 microns) in the far infra-red which might be used, which would require larger diffraction grating elements.

We claim:

1. An infra-red imaging system comprising, in combination:

an array of bi-state diffraction grating elements, each bi-state diffraction grating element having an activated state providing diffraction of incident infra-red radiation at a predetermined angle relative to an incident direction and an alternative inactivated state not providing diffraction of incident infra-red radiation at the predetermined angle;

first optical means for collecting infra-red radiation from a scene and directing the collected infra-red radiation toward the array of bi-state diffraction grating elements to form an infra-red image of the scene thereon;

means for scanning the image on the array by sequentially activating the bi-state diffraction grating elements temporarily from their deactivated states to their activated states, whereby a scanned infra-red image of the scene is diffracted from the array at the predetermined angle;

second optical means for collecting and directing infra-red radiation diffracted from the grating elements at the predetermined angle, an infra-red detector disposed to receive and detect infra-red radiation collected and directed by the second optical means so as to provide a coded electrical representation of the scanned infra-red image of the scene; and means for generating a human-detectable signal derived from the coded representation of the scanned infra-red image of the scene.

2. An infra-red imaging system according to claim 1 in which the means for scanning the image on the array delays the activation of each bi-state diffraction grating element to its activated state for a predetermined time period after a deactivation to a deactivated state of the previous sequentially activated diffraction grating element to chop the scanned infra-red image of the scene.

3. An infra-red imaging system according to claim 1 in which a first portion of the infra-red radiation diffracted by each bi-state diffraction grating element in its activated state is diffracted at the predetermined angle in a first direction relative to the incident direction and a second portion of the infra-red radiation diffracted by each bi-state diffraction grating element in its activated state is diffracted at the predetermined angle in a second, opposing direction relative to the incident direction, a first infra-red detector is disposed to receive the first portion of the infra-red radiation diffracted at the predetermined angle in the first direction, a second infra-red detector is disposed to receive the second portion of the infra-red radiation diffracted at the predetermined angle in the second direction, and the means for generating a human-detectable signal is responsive to output signals from both the first and second infra-red detectors.

4. An infra-red imaging system according to claim 1 in which the infra-red radiation directed toward the array of bi-state diffraction grating elements comprises first and second infra-red wavelengths, each bi-state diffraction grating element in its activated state diffracts infra-red radiation of the first wavelength at a first predetermined angle relative to the incident direction and diffracts infra-red radiation of the second wavelength at a second predetermined angle relative to the incident direction, a first infra-red detector is provided to receive the infra-red radiation diffracted at the first predetermined angle, a second infra-red detector is provided to receive the infra-red radiation diffracted at the second predetermined angle, and the means for generating a human-detectable signal is responsive to outputs from both the first and second infra-red detectors.

5. An infra-red imaging system according to claim 4 in which the first infra-red wavelength is within a first band of infra-red wavelengths including 2.3 microns providing high transmittance through atmospheric moisture and the second infra-red wavelength is within a second band of infra-red wavelengths including 4 microns providing high transmittance through atmospheric moisture.

6. An infra-red imaging system according to claim 1 in which the infra-red radiation directed toward the array of bi-state diffraction grating elements comprises first and second infra-red wavelengths, the array comprises bi-state diffraction grating elements having a first grating pitch providing diffraction, in the activated state, of infra-red radiation of the first wavelength at the predetermined angle relative to the incident direction and bi-state diffraction grating elements having a second grating pitch providing diffraction, in the activated state, of IR radiation of the second wavelength at the predetermined angle relative to the incident direction, the diffraction grating elements having the first grating pitch being mixed in the array with the diffraction grating elements having the second grating pitch in a predetermined alternating pattern so that the means for scanning provides simultaneous scanned and chopped infra-red images at each of the first and second infra-red wavelengths at the predetermined angle to the infra-red detector.

7. An infra-red imaging system according to claim 6 in which the first infra-red wavelength is within a first band of infra-red wavelengths including 2.3 microns providing high transmittance through atmospheric moisture and the second infra-red wavelength is within a second band of infra-red wavelengths including 4 microns providing high transmittance through atmospheric moisture.

* * * * *